H. FITZSIMMONS.
Thill-Coupling.

No. 133,428.

Patented Nov. 26, 1872.

Witnesses:
Fred Haynes
Ferd Tusch

Henry Fitzsimmons
per Kionn & Allen
Attorneys

UNITED STATES PATENT OFFICE.

HENRY FITZSIMMONS, OF HOUSTON, TEXAS, ASSIGNOR TO HIMSELF AND JOHN W. McDONALD, OF SAME PLACE.

IMPROVEMENT IN THILL-COUPLINGS.

Specification forming part of Letters Patent No. 133,428, dated November 26, 1872.

*To all whom it may concern:*

Be it known that I, HENRY FITZSIMMONS, of Houston, in the county of Harris and State of Texas, have invented a new and Improved Pole and Shaft Coupling, of which the following is a specification:

This invention relates to a novel construction of the coupling whereby provision is made for the easy connection and disconnection of the shafts or pole of the vehicle without any unscrewing or removal of bolts or pins.

Figure 1:
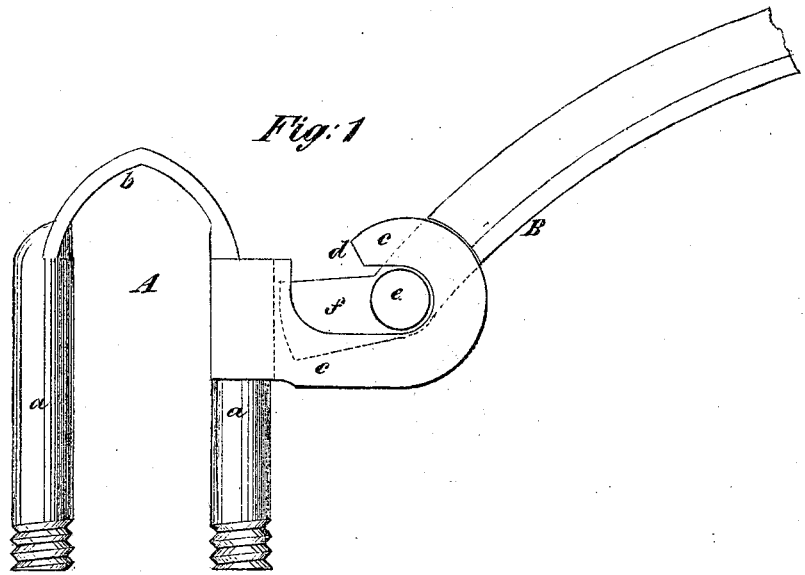
Figure 2:
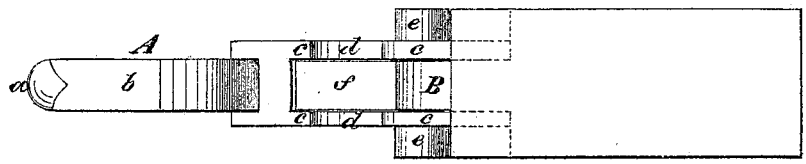

Figure 1 in the accompanying drawing is a side view of a coupling constructed according to my invention. Fig. 2 is a plan of the same.

Similar letters of reference indicate corresponding parts in the several figures.

The coupling is composed of two pieces, A and B, the latter of which may be called the shaft-iron and the former the clip-iron. The clip-iron is made in part like an ordinary clip, as shown at *a a b*, for attachment to the front axle of the vehicle in the usual way, but has attached to or formed upon its front part two hooks, *c c*, which are arranged side by side and project horizontally, or nearly so, in a forward direction, and which resemble an inverted claw. The shaft-iron B is made so that it can be inserted between the hooks *c c* of the clip-iron and with two projecting pivots or trunnions, *e e*, on its sides, of a size to fit easily within the hooks *c c*, one in each hook, the openings *d d* of the hooks being just large enough to let the said pivots pass freely in and out. Behind these pivots there is provided on the shaft-iron a projecting piece, *f*, which forms a lock to secure the two parts of the coupling together, the length of the said piece being just sufficient to fill the length of the space within the hooks *d d* when the pivots *e e* are close up to the front bends of the hooks, as shown in Fig. 1. When it is desired to connect the pole or shaft all that it is necessary to do is to place it in such a position that the pivots *e e* shall be across the openings *d d* of the hooks *c c*, and then to allow said pivots to drop into the hook and pull or press the pole or shaft forward till the pivots come to their bearings at the bends of the hooks, where, so long as draft is applied, they would continue to stay. By then dropping the pole or shaft to bring the locking-piece *f* against the back part of the space between the hooks the coupling is locked, and the locking is undisturbed until the pole or shaft is raised to uncouple it. The locking-piece *f* also serves to obtain a bearing against the clip for backing.

What I claim as my invention, and desire to secure by Letters Patent, is—

The locking piece or stub *f* on the thill-iron arranged to butt against the clip A, in combination with the pivots *e e* and hooks *c c*, as shown and described.

HENRY FITZSIMMONS.

Witnesses:
J. S. BACHELDER,
WM. REGOU.